US010977808B2

(12) United States Patent
Newman

(10) Patent No.: US 10,977,808 B2
(45) Date of Patent: Apr. 13, 2021

(54) THREE-FRAME DIFFERENCE TARGET ACQUISITION AND TRACKING USING OVERLAPPING TARGET IMAGES

(71) Applicant: Raytheon Company, Waltham, MA (US)

(72) Inventor: Arthur M. Newman, Sherman Oaks, CA (US)

(73) Assignee: Raytheon Company, Waltham, MA (US)

( * ) Notice: Subject to any disclaimer, the term of this patent is extended or adjusted under 35 U.S.C. 154(b) by 96 days.

(21) Appl. No.: 16/278,633

(22) Filed: Feb. 18, 2019

(65) Prior Publication Data

US 2020/0265592 A1 Aug. 20, 2020

(51) Int. Cl.
*G06T 7/246* (2017.01)
*G06T 3/00* (2006.01)

(52) U.S. Cl.
CPC ............ *G06T 7/248* (2017.01); *G06T 3/0093* (2013.01)

(58) Field of Classification Search
CPC .......... G01S 3/7864; G01S 7/24; G01S 7/415; G06K 9/00771; G06K 9/3233
See application file for complete search history.

(56) References Cited

U.S. PATENT DOCUMENTS 4,937,878 A 6/1990 Lo et al.
5,150,426 A 9/1992 Banh et al.
5,960,097 A 9/1999 Pfeiffer et al.
6,191,812 B1 * 2/2001 Tzidon .................. H04N 5/222 348/135
6,512,537 B1 * 1/2003 Shimizu ........... G08B 13/19602 348/152
6,674,798 B2 * 1/2004 Ishihara ................. H04N 5/145 348/413.1
6,771,834 B1 * 8/2004 Martins ..................... G06T 7/11 382/173
7,428,345 B2 * 9/2008 Caspi ........................ G06T 7/20 348/36
7,456,875 B2 * 11/2008 Kashiwa .......... G08B 13/19621 348/207.99
7,483,551 B2 1/2009 Chen
7,583,275 B2 * 9/2009 Neumann ............... G06T 17/00 345/419
7,933,464 B2 4/2011 Zhang et al.
(Continued)

OTHER PUBLICATIONS

International Search Report and Written Opinion of the International Searching Authority in connection with International Patent Application No. PCT/US2019/054852 dated Jan. 13, 2020, 11 pages.
Lan et al., "Robot Fish Detection Based on a Combination Method of Three-Frame-Difference and Background Subtraction", 2014 26th Chinese Control and Decision Conference, May-Jun. 2014, p. 3905-3909.
(Continued)

*Primary Examiner* — Yosef Kassa

(57) ABSTRACT

A three-frame difference target-tracking system includes at least one processor configured to generate multiple aligned image frames of a scene. The aligned image frames include first, second, and third image frames. The at least one processor is also configured to identify differences between the first image frame and the second image frame, between the second image frame and the third image frame, and between the first image frame and the third image frame. The at least one processor is further configured to identify a direction of movement of a target in the scene based on the identified differences.

21 Claims, 11 Drawing Sheets

(56) References Cited

U.S. PATENT DOCUMENTS

| | | | | |
|---|---|---|---|---|
| 8,036,425 | B2 * | 10/2011 | Hou | G06K 9/00771 382/103 |
| 8,264,616 | B2 * | 9/2012 | Sugano | G11B 27/28 348/700 |
| 8,374,383 | B2 * | 2/2013 | Long | G06T 7/194 382/100 |
| 8,553,933 | B2 | 10/2013 | Newman et al. | |
| 8,588,546 | B2 * | 11/2013 | Habuka | H04N 1/3876 382/284 |
| 8,611,600 | B2 | 12/2013 | Newman et al. | |
| 8,628,417 | B2 * | 1/2014 | Rofougaran | G01S 13/426 463/39 |
| 8,854,469 | B2 * | 10/2014 | Horbinger | G06T 7/254 348/159 |
| 8,878,946 | B2 * | 11/2014 | Fujita | H04N 5/23254 348/208.13 |
| 9,454,819 | B1 * | 9/2016 | Seetharaman | G06K 9/6277 |
| 2008/0037869 | A1 | 2/2008 | Zhou | |
| 2010/0008423 | A1 | 1/2010 | Namboodiri et al. | |
| 2012/0162506 | A1 | 6/2012 | Tsyrganovich | |

OTHER PUBLICATIONS

Du et al., "Object Tracking in Satellite Videos by Fusing the Kernel Correlation Filter and the Three-Frame-Difference Algorithm", IEEE Geoscience and Remote Sensing Letters, vol. 15, No. 2, Feb. 2018, p. 168-172.

Wu et al., "Moving Target Detection Based on Improved Three Frame Difference and Visual Background Extractor", 2017 10th International Congress on Image and Signal Processing, BioMedical Engineering and Informatics (CISP-BMEI 2017), Oct. 2017, 5 pages.

Kumar et al., "Aerial Video Surveillance and Exploitation", Proceeding of the IEEE, vol. 89, No. 10, Oct. 2001, p. 1518-1539.

Xiao et al., "Vehicle detection and tracking in wide field-of-view aerial video", 2010 IEEE Computer Society Conference on Computer Vision and Pattern Recognition, Jun. 2010, p. 679-684.

Anonymous, "Phase correlation", http://en.wikipedia.org/w/index.php?title=Phase_correlation&oldid=436506748, Jun. 2011, 4 pages.

* cited by examiner

402

406

404

502

506

504

602

606

604

THREE-FRAME DIFFERENCE TARGET ACQUISITION AND TRACKING USING OVERLAPPING TARGET IMAGES

TECHNICAL FIELD

This disclosure generally relates to tracking systems. More specifically, this disclosure relates to three-frame difference target acquisition and tracking using overlapping target images.

BACKGROUND

Video tracking systems may be used to locate a moving object over time using a camera or other imaging device. These systems have a variety of uses that include human-computer interaction, security and surveillance, video communication and compression, augmented reality, traffic control, medical imaging, and video editing. Video tracking can be processing-intensive due to the amount of data that is contained in video. Adding further to the complexity of video tracking is the possible need to use object recognition techniques for tracking.

Some tracking systems identify moving targets by subtracting background estimates from current frames of video. One problem with these tracking systems is that the background estimates may take many frames to compute and may be corrupted by motion of a target. Another problem with these tracking systems is that they are not suitable for moving platforms because parallax-induced motion affects the background estimates.

SUMMARY

This disclosure provides three-frame difference target acquisition and tracking using overlapping target images.

In a first embodiment, a three-frame difference target-tracking system includes at least one processor configured to generate multiple aligned image frames of a scene. The aligned image frames include first, second, and third image frames. The at least one processor is also configured to identify differences between the first image frame and the second image frame, between the second image frame and the third image frame, and between the first image frame and the third image frame. The at least one processor is further configured to identify a direction of movement of a target in the scene based on the identified differences.

In a second embodiment, a three-frame difference target-tracking method includes generating multiple aligned image frames of a scene. The aligned image frames include first, second, and third image frames. The method also includes identifying differences between the first image frame and the second image frame, between the second image frame and the third image frame, and between the first image frame and the third image frame. The method further includes identifying a direction of movement of a target in the scene based on the identified differences.

In a third embodiment, a non-transitory computer readable medium contains instructions that when executed cause a three-frame difference target-tracking system to generate multiple aligned image frames of a scene. The aligned image frames include first, second, and third image frames. The medium also contains instructions that when executed cause the three-frame difference target-tracking system to identify differences between the first image frame and the second image frame, between the second image frame and the third image frame, and between the first image frame and the third image frame. The medium further contains instructions that when executed cause the three-frame difference target-tracking system to identify a direction of movement of a target in the scene based on the identified differences.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

FIGS. 1 through 10, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

As noted above, some tracking systems identify moving targets by subtracting background estimates from current frames of video. Unfortunately, the background estimates may take an excessive amount of time or processing to compute and may be corrupted by motion of a target. Also, these tracking systems are not suitable for use with moving platforms because parallax-induced motion affects the background estimates. While some approaches are able to accurately detect moving targets using a limited number of image frames, these approaches may still suffer from various issues. For instance, some approaches may require that an object move its own length (at a minimum) between video frames in order to be detected. This can be problematic in some situations, such as when attempting to track a slow-moving target (like a vehicle in rush-hour traffic or at a stoplight) or when attempting to track slow-moving swarming targets over a terrain. This can also be problematic if multiple images of a target (even a fast-moving target) are captured at a high frame rate.

This disclosure describes techniques for three-frame difference target acquisition. As the name implies, these techniques use differences between three image frames to identify one or more targets. Among other things, these techniques support automatic detection of one or more moving targets using a novel approach for calculating target velocity and a novel approach for resolving frame difference ambiguities. The outputs generated using these techniques may include motion or velocity vectors for one or more targets, which can be used to perform functions such as tracking initiation or tracking assignment. These techniques can be used to identify targets with a very short burst of image frames, rather than requiring many frames to identify an image background. Also, these techniques can be used with moving platforms since they are able to reduce parallax-induced clutter. In addition, these techniques do not require that each target move at least its own respective length between image frames, which allows these techniques to be used with one or more slow-moving targets or with high frame rate image sensors.

Figure 1:
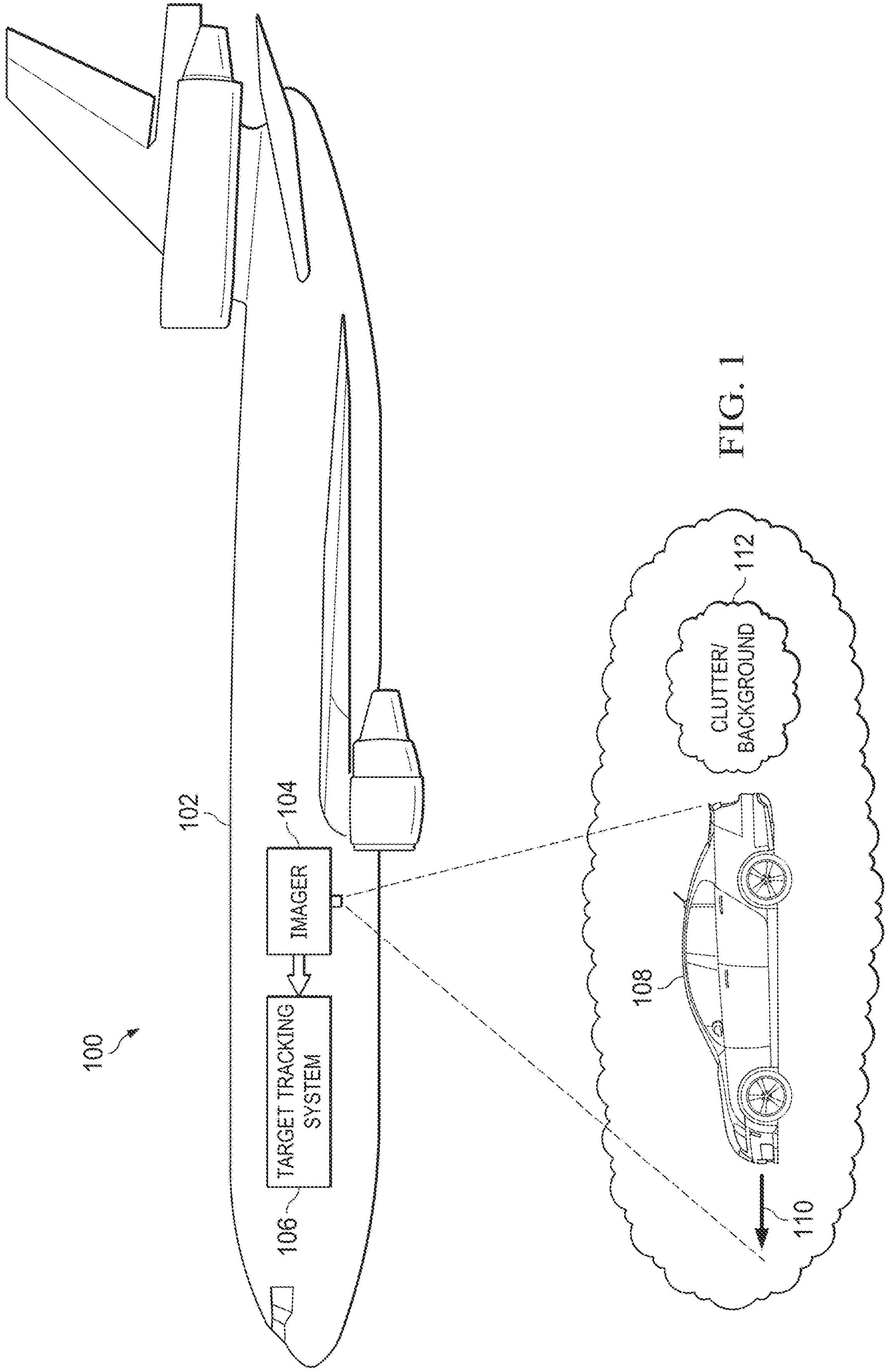
FIG. 1 illustrates an example operational environment of a target-tracking system in accordance with this disclosure.

FIG. 1 illustrates an example operational environment 100 of a target-tracking system in accordance with this disclosure. As shown in FIG. 1, the operational environment 100 includes a platform 102, which carries or otherwise includes an imager 104 and a target-tracking system 106. The platform 102 generally represents any suitable structure configured to contain or include one or more components used for target acquisition or target tracking functions. In this example, the platform 102 represents a specific type of aircraft. However, the platform 102 may include any other suitable movable platform, such as an airplane, drone or other unmanned aerial vehicle (UAV), satellite, or other space or airborne vehicle. The platform 102 may also represent a fixed platform, such as a fixed structure in a parking lot or other area used for surveillance or other functions. In general, the scope of this disclosure is not limited to use with any specific type or types of platform 102.

The imager 104 is configured to capture multiple image frames of at least one scene that includes one or more moving targets 108. For example, the imager 104 may capture a video sequence or other rapid sequence of image frames of a scene. The imager 104 outputs the captured image frames (possibly after performing some pre-processing of the image frames) to the target-tracking system 106. The imager 104 includes any suitable structure configured to capture image frames, such as a camera or other imaging device. Numerous types of imaging devices are known in the art, and numerous other types of imaging devices are sure to be developed in the future. Again, the scope of this disclosure is not limited to use with any specific type or types of imager 104. The image frames can be captured in any suitable manner, such as by capturing visible image frames, infrared image frames, or other types of image frames. In some embodiments, the imager 104 may include one or more wide-area sensors configured to capture image data associated with a large area, although other suitable imagers 104 may also be used.

The target-tracking system 106 is configured to identify and track at least one moving target 108 and identify at least one target track 110 associated with the target(s) 108. In some embodiments, the target-tracking system 106 is suitable for identifying and tracking one or more targets 108 in an environment with high-clutter 112. In accordance with various embodiments of this disclosure, the imager 104 may provide image frames to the target-tracking system 106, and the target-tracking system 106 is configured to process the image frames and generate one or more output images for subsequent image processing. The output images can be used to support functions such as target acquisition and target tracking.

The target-tracking system 106 supports three-frame difference target acquisition by identifying and using differences between three image frames to identify one or more targets 108 and a direction of movement of each target 108. For example, the target-tracking system 106 may be configured to register or associate image information of first and second warped image frames with image information of a reference image frame. The target-tracking system 106 may also be configured to offset pixels of the warped image frames based on the outputs of the registration in order to align the warped image frames with the reference image frame. At this point, objects in the three image frames are (ideally) aligned with each other. The target-tracking system 106 also performs various three-frame difference calculations using the reference and offset image frames to generate a three-frame difference image frame, which identifies the differences between the aligned image frames. The target-tracking system 106 further generates at least one output image and identifies a target track 110 (a direction of movement) for one or more targets 108 contained in the aligned image frames or the output image. This can be repeated any number of times using different (and possibly overlapping) sets of image frames to identify movement of one or more targets 108 over time.

The use of three image frames can be sufficient to segment a moving target without the need to perform a background estimate. As a result, unlike prior approaches, computationally-expensive background estimates are not needed here. Moreover, the three-frame difference calculation may locate and substantially remove mis-registration and parallax-induced clutter in the image frames. Thus, the target-tracking system 106 may be suitable for use on a moving platform 102. However, this is not a requirement since the target-tracking system 106 is equally suitable for use on a non-moving platform.

Although FIG. 1 illustrates one example operational environment 100 of a target-tracking system 106, various changes may be made to FIG. 1. For example, the target-tracking system 106 may be used in any other operational environment in which target acquisition or tracking is needed or desired. Also, the target-tracking system 106 may be used to acquire or track any suitable target(s) and is not limited to tracking a single ground vehicle. In addition, the platform 102 may include any suitable number of imagers 104 and/or any suitable number of target-tracking systems 106.

Figure 2:
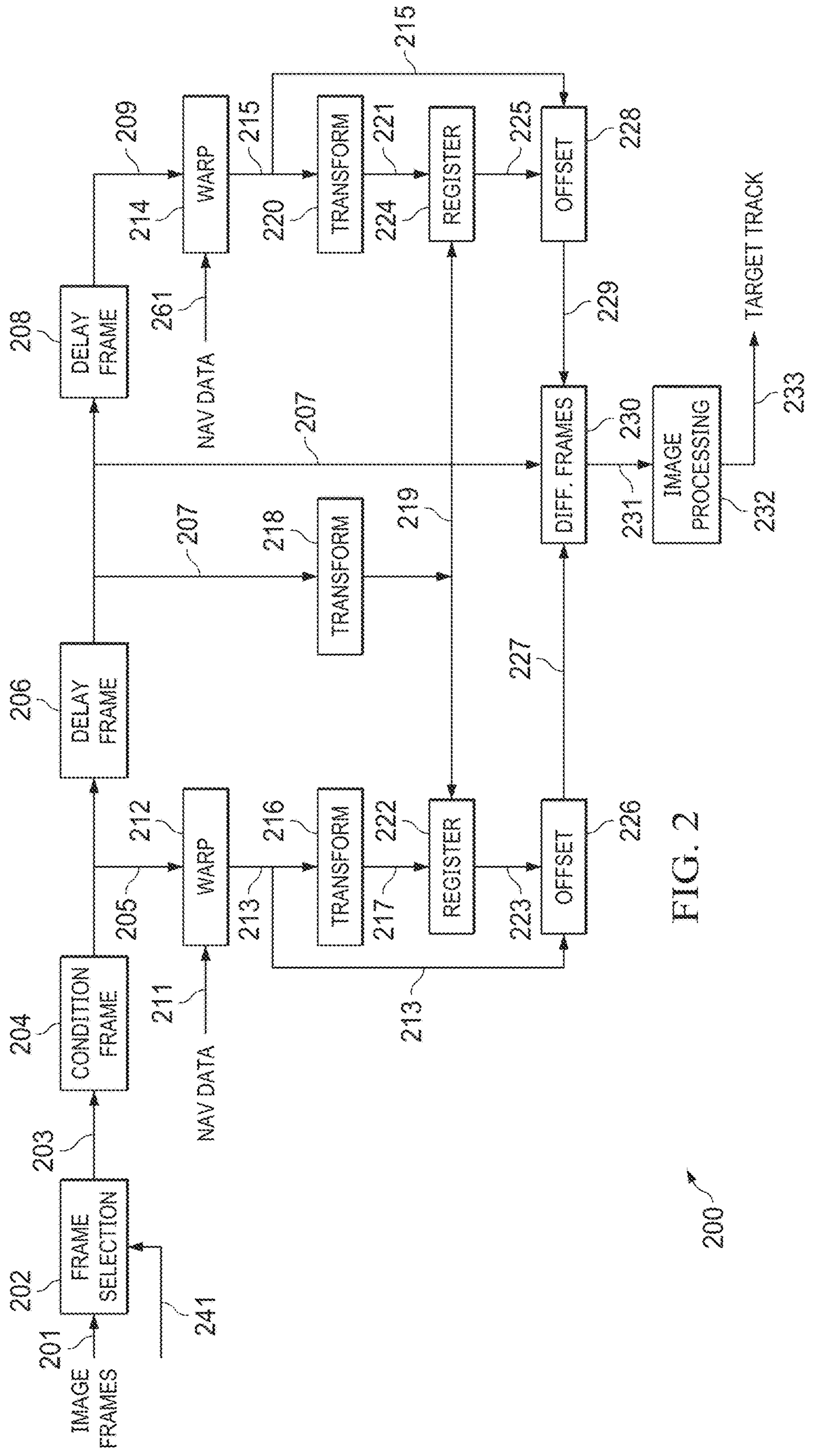
FIG. 2 illustrates an example three-frame difference target-tracking system in accordance with this disclosure.

FIG. 2 illustrates an example three-frame difference target-tracking system 200 in accordance with this disclosure. For ease of explanation, the target-tracking system 200 of FIG. 2 is described as being used as the target-tracking system 106 on the platform 102 in the operational environment 100 of FIG. 1. However, the target-tracking system 200 of FIG. 2 may be used with any suitable platform and in any suitable operational environment.

As shown in FIG. 2, the target-tracking system 200 is configured to receive input image frames 201 from a suitable source, such as the imager 104 in FIG. 1. The target-tracking system 200 may also receive navigation data 211, 261 and frame timing and target information 241 from the imager 104 and from a platform, such as the platform 102 in FIG. 1. The target-tracking system 200 is configured to process this information to generate at least one output image 233 and identify a target track of a target, such as the target 108 in FIG. 1.

In this example embodiment, the target-tracking system 200 includes a frame-selection element 202, which is configured to select image frames 201 (such as from a video stream or other input stream) and to output selected image frames 203. In some embodiments, the frame-selection element 202 is configured to select the image frames 203 based on the frame timing and target information 241. The frame timing and target information 241 may include various information, such as frame-timing information of the image frames 201. Also, in some embodiments, the frame-selection element 202 may select sequential incoming image frames 201 as the image frames 203 or every $i^{th}$ incoming image frame 201 as the image frames 203 (where i may range from two to one hundred or more). For instance, every third image frame 201 may be selected in some embodiments, while every tenth or hundredth image frame 201 may be selected in other embodiments. In some instances, a ground sample distance may be used to estimate the amount of ground that each pixel of the image frames 201 represents, and this estimate can be used in determining how often image frames 201 are selected by the frame-selection element 202.

A condition element 204 is configured to condition the selected image frames 203. For example, the selected image frames 203 may be conditioned by the condition element 204 to remove or reduce noise, correct for corrupted pixels, and correct for brightness (among other things). In general, the condition element 204 may perform any desired pre-processing operations involving the selected image frames 203.

Delay elements 206, 208 are configured to delay image frames by specified amounts. In some embodiments, for example, each delay element 206, 208 is configured to delay an image frame by a predetermined or other specified delay time (denoted n). Also, in some embodiments, the selected image frames 203 in a group of selected image frames 203 are output sequentially by the condition element 204. The first selected image frame 203 that is output by the condition element 204 may be delayed by both delay elements 206, 208 and may be considered a twice-delayed image frame 209 (having a delay of 2 n). The second selected image frame 203 that is output by the condition element 204 may be delayed by the delay element 206 and may be used as a reference image frame 207 (having a delay of n). The third selected image frame 203 that is output by the condition element 204 may not be delayed by either delay element 206 or 208 and may be used as a third image frame 205.

Warping elements 212, 214 are configured to receive the image frames 205, 209, respectively, and to generate first and second warped image frames 213, 215, respectively. In some embodiments, the warping element 212 is configured to warp the image frame 205 to generate the first warped image frame 213 based on the navigation data 211, and the warping element 214 is configured to warp the image frame 209 to generate the second warped image frame 215 based on the navigation data 261. Warping the image frame 205 may align non-moving objects in the image frame 205 so that they occupy the same positions as they do in the reference image frame 207. Likewise, warping the image frame 209 may align non-moving objects in the image frame 209 so that they occupy the same positions as they do in the reference image frame 207. The use of the navigation data 211, 261 here allows the image frames 205, 209 to be aligned with the reference image frame 207.

Transform elements 216, 218, 220 are configured to operate on the image frames 213, 207, 215, respectively, and generate image information 217, 219, 221, respectively. In some embodiments, each of the transform elements 216, 218, 220 is configured to perform a transform on an image frame 213, 207, 215 in order to generate spatial frequency domain image information 217, 219, 221 of the image frame 213, 207, 215. In particular embodiments, the transform elements 216, 218, 220 are configured to perform discrete Fourier transforms, such as fast Fourier transforms (FFTs). In these embodiments, performing an FFT on the first warped image frame 213 generates the spatial frequency domain image information 217, performing an FFT on the reference image frame 207 generates the spatial frequency domain image information 219, and performing an FFT on the second warped image frame 215 generates the spatial frequency domain image information 221. Depending on the implementation, the FFTs may or may not be performed concurrently (in parallel) on the image frames 213, 207, 215.

Registration elements 222, 224 are configured to receive and use the image information 217, 219, 221. For example, the registration element 222 is configured to align the image information 217 of the first warped image frame 213 with the image information 219 of the reference image frame 207. Similarly, the registration element 224 is configured to align the image information 221 of the second warped image frame 215 with the image information 219 of the reference image frame 207. In some embodiments, the registration element 222 may perform a first correlation to correlate the spatial frequency domain image information 217 and 219, and the registration element 224 may perform a second correlation to correlate the spatial frequency domain image information 221 and 219.

Offset elements 226, 228 receive the warped image frames 213, 215 and outputs 223, 225 of the registration elements 222, 224. The offset element 226 is configured to offset pixels of the first warped image frame 213 based on the output 223 of the registration element 222. This is done in order to align the pixels of the first warped image frame 213 with corresponding pixels of the reference image frame 207 and generate a first offset image frame 227. Similarly, the offset element 228 is configured to offset the pixels of the second warped image frame 215 based on the output 225 of the registration element 224. This is done in order to align the pixels of the second warped image frame 215 with corresponding pixels of the reference image frame 207 and generate a second offset image frame 229. In some embodiments, the pixels of the first warped image frame 213 may be offset by the offset element 226 based on the first correlation performed by the registration element 222 to align the pixels with corresponding pixels of the reference image frame 207 and generate the first offset image frame 227. Similarly, pixels of the second warped image frame 215 may be offset by the offset element 228 based on the second correlation performed by the registration element 224 to align the pixels with corresponding pixels of the reference image frame 207 and generate the second offset image frame 229. The correlations may help correct for errors in the navigation data 211, 261 or remove translation errors.

A three-frame difference calculation element 230 performs pixel-by-pixel difference calculations on the first offset image frame 227, the second offset image frame 229, and the reference image frame 207 to generate a three-frame difference output image 231. In some embodiments, the calculation element 230 performs these calculations as follows. The calculation element 230 identifies a difference frame between the image frames 227, 207, a difference frame between the image frames 207, 229, and a difference frame between the image frames 227, 229. Each difference frame represents the differences between pixel values in the two associated image frames. The calculation element 230 applies thresholds to the difference frames to generate thresholded difference frames, where the thresholded difference frames identify only those differences from the difference frames that are statistically significant. The calculation element 230 identifies regions in the thresholded difference frames that share the same spatial extent (meaning these regions overlap in the thresholded difference frames). In other embodiments, the calculation element 230 performs pointwise multiplications of the difference frames to identify where the difference frames overlap. Based on those overlapping regions, the calculation element 230 is able to construct at least one motion or velocity vector, such as by defining a vector between different centers of mass for related regions. This allows the calculation element 230 to perform three-frame difference calculations in order to identify one or more target tracks. Example operations that can be performed by the three-frame difference calculation element 230 are described below.

An image-processing element 232 may be configured to perform image processing on the three-frame difference output image 231. For example, the image-processing element 232 may be configured to perform image processing on the three-frame difference output image 231 to segment the pixels of the background from non-background pixels to detect moving objects in the image. A target track 110 and an initial target location may also be determined for each target 108 in the image 231. The image-processing element 232 can further generate at least one output image 233 with a target-track for each target 108 contained in the image 233. Each target-track may identify a target and contain one or more motion or velocity vectors associated with that target. Example operations that can be performed by the image-processing element 232 are described below.

In some embodiments, the navigation data 211, 261 includes first and second navigation data streams that include position information of the imager 104, directional information of the imager 104 (such as a direction the imager 104 is pointed), and velocity information of the imager 104 (such as when the imager 104 is moving). In these embodiments, the navigation data 211, 261 may take into account the movement of the platform 102 (if any). For instance, the navigation data 211, 261 may describe the position and altitude of the platform 102, which may correspond to the position of the imager 104. The navigation data 211, 261 may also describe where the imager 104 is pointed in embodiments in which the imager 104 is configured to swivel or otherwise be redirected. The navigation data 211, 261 may further describe additional imager-related information for use by the warping elements 212, 214 to calculate an image warp so that the warped image frames 213, 215 will overlay with the reference image frame 207. The additional imager-related information may include specifications that can change in real-time, such as the focal length (zoom) of the imager 104, the wavelengths that the imager 104 is recording (such as black and white, color, or infrared), etc. As a result, the warping elements 212, 214 may perform dynamic and real-time image warping.

Also, in some embodiments, a one-to-one correspondence between the navigation data 211, 261 and the image frames 205, 209 may be provided. In other embodiments, the navigation data 211, 261 and the image frames 205, 209 may be recorded at different rates. When recorded at different rates, the navigation data 211, 261 may be interpolated to correspond to the time when a corresponding image frame is captured. In fixed-imager embodiments (such as parking lot surveillance situations), the navigation data may be fixed, and the navigation data 211 may be the same as the navigation data 261.

In addition, in some embodiments, the target-tracking system 200 may be configured to perform the delay, warp, transform, register, offset, difference calculation, and clutter suppression operations for multiple sets of image frames over time. For example, in some embodiments, the target-tracking system 200 may repeat these operations in such a way that the reference image frame 207 from a prior iteration becomes the twice-delayed image frame 209 for the current iteration and the third image frame 205 from the prior iteration becomes the reference image frame 207 for the current iteration. Here, the target-tracking system 200 effectively implements a three-frame sliding window, where the window identifies three frames for each iteration and the window slides after each iteration to drop one of the image frames and add a new image frame. However, other implementations of the target-tracking system 200 may be used.

Note that while often described above as being used to acquire or track a single target, the target-tracking system 200 shown in FIG. 2 can be used to acquire or track any suitable number of targets that are captured in the image frames 201. Among other things, this can be done to help differentiate one or more specific targets from among other targets or from among objects not of interest.

The target-tracking system 200 shown in FIG. 2 can be implemented in any suitable manner. For example, in some embodiments, all of the functional elements shown in FIG. 2 may be implemented using software instructions that are executed by one or more processing devices. In other embodiments, at least some of the functional elements shown in FIG. 2 may be implemented using dedicated hardware components. In general, the target-tracking system 200 shown in FIG. 2 can be implemented using any suitable hardware or any suitable combination of hardware and software/firmware instructions. As particular examples, one or more of the functional elements may be implemented using one or more combinations of software-configured elements, such as processing devices and/or other hardware elements. At least some elements in FIG. 2 may include or be implemented using one or more microprocessors, digital signal processors (DSPs), application specific integrated circuits (ASICs), field programmable gate arrays (FPGAs), or discrete circuitry for performing at least the functions described above.

Although FIG. 2 illustrates one example of a three-frame difference target-tracking system 200, various changes may be made to FIG. 2. For example, various components shown in FIG. 2 can be combined, further subdivided, rearranged, or omitted and additional components can be added according to particular needs.

Figure 3:
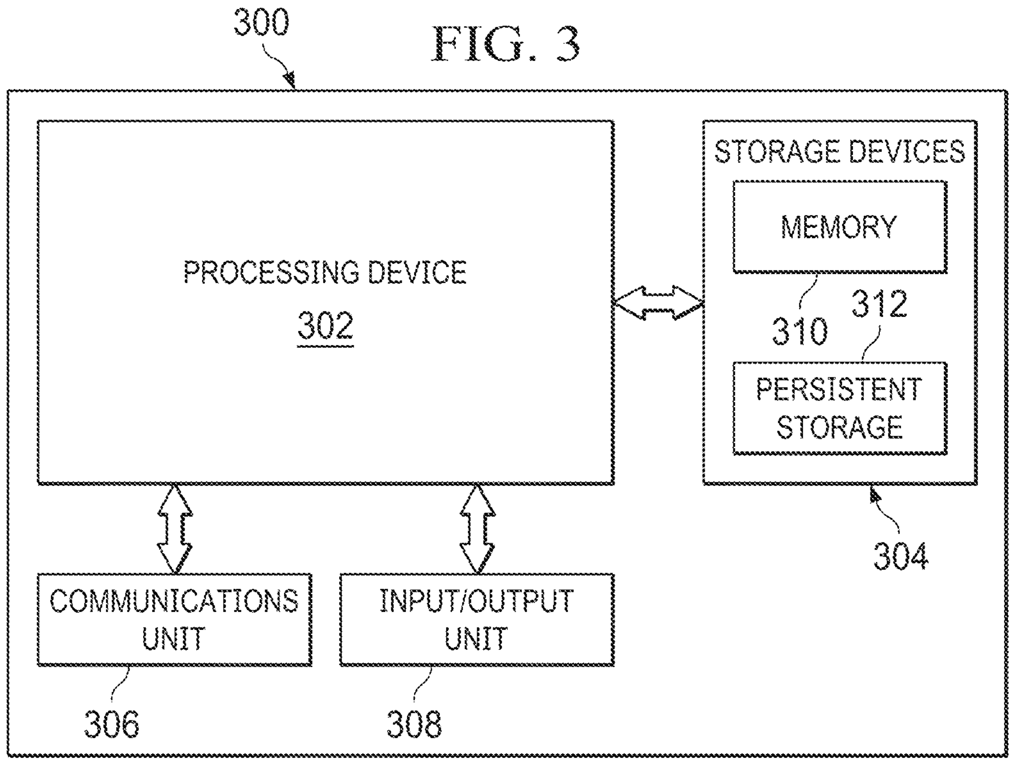
FIG. 3 illustrates an example data processing system for use in a three-frame difference target-tracking system in accordance with this disclosure.

FIG. 3 illustrates an example data processing system 300 for use in a three-frame difference target-tracking system in accordance with this disclosure. The data processing system 300 may, for example, be used to implement the target-tracking system 200 of FIG. 2. However, as noted above, the target-tracking system 200 of FIG. 2 may be implemented in any other suitable manner.

As shown in FIG. 3, the system 300 denotes a computing device or system that includes at least one processing device 302, at least one storage device 304, at least one communications unit 306, and at least one input/output (I/O) unit 308. The processing device 302 executes instructions that may be loaded into a memory 310. The processing device 302 includes any suitable number(s) and type(s) of processors or other devices in any suitable arrangement. Example types of processing devices 302 include microprocessors, microcontrollers, DSPs, ASICs, FPGAs, and discrete circuitry.

The memory 310 and a persistent storage 312 are examples of storage devices 304, which represent any structure(s) capable of storing and facilitating retrieval of information (such as data, program code, and/or other suitable information on a temporary or permanent basis). The memory 310 may represent a random access memory or any other suitable volatile or non-volatile storage device(s). The persistent storage 312 may contain one or more components or devices supporting longer-term storage of data, such as a read only memory, hard drive, Flash memory, or optical disc.

The communications unit 306 supports communications with other systems or devices. For example, the communications unit 306 can include a network interface card or a wireless transceiver facilitating communications over a wired or wireless network. The communications unit 306 may support communications through any suitable physical or wireless communication link(s).

The I/O unit 308 allows for input and output of data. For example, the I/O unit 308 may provide a connection for user input through a keyboard, mouse, keypad, touchscreen, or other suitable input device. The I/O unit 308 may also send output to a display, printer, or other suitable output device. As a particular example, the I/O unit 308 may be used to provide at least one output image 231 and at least one target-track output 233 to one or more display devices.

In some embodiments, the instructions executed by the processing device 302 can include instructions that implement the target-tracking system 200 shown in FIG. 2. For example, the instructions executed by the processing device 302 may include instructions that receive or otherwise obtain image frames 201 and that implement one, some, or all of the functional elements shown in FIG. 2 and described above.

Although FIG. 3 illustrates one example of a data processing system 300 for use in a three-frame difference target-tracking system, various changes may be made to FIG. 3. For example, it is assumed here that the target-tracking system 200 of FIG. 2 is implemented using software/firmware that is executed by the processing device(s) 302. However, any other suitable hardware implementation or hardware and software/firmware implementation can be used to implement this functionality. Also, computing devices and systems come in a wide variety of configurations, and FIG. 3 does not limit this disclosure to any particular computing device or system.

The following describes one specific example of the types of operations that can be performed by the target-tracking system 200 using the approaches described in this patent document. The example provided below simply represents one way in which the target-tracking system 200 might be used. Of course, the target-tracking system 200 can be used in any other suitable manner.

Figure 4A:
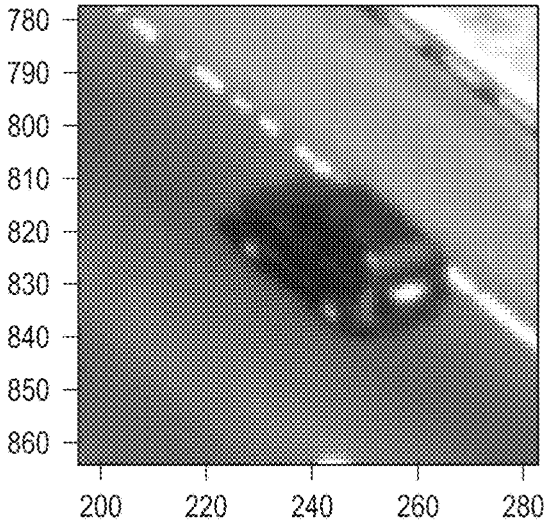
FIGS. 4A through 4C illustrate example image frames that may be processed by a three-frame difference target-tracking system in accordance with this disclosure.
Figure 4C:
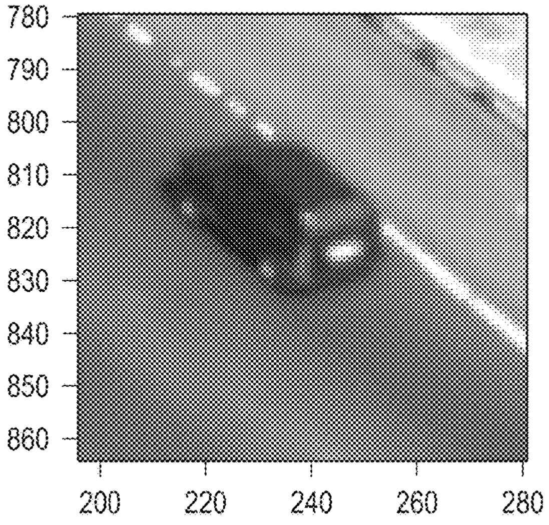
Figure 4B:
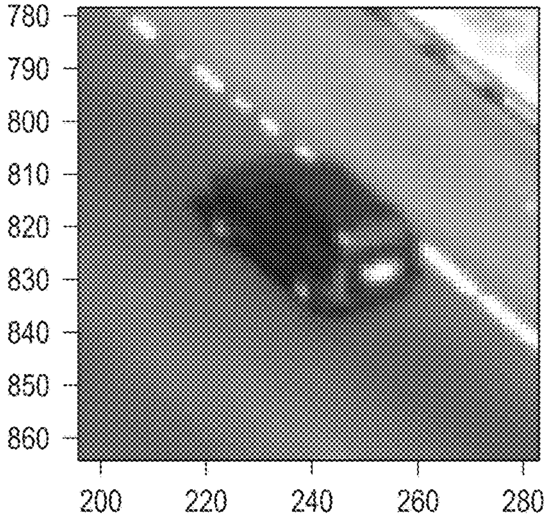

FIGS. 4A through 4C illustrate example image frames 402, 404, 406 that may be processed by a three-frame difference target-tracking system 200 in accordance with this disclosure. In this example, the image frames 402, 404, 406 represent images of a target (namely a vehicle) driving down a road. The image frames 402, 404, 406 can, for example, represent image frames captured by the imager 104 in the operational environment 100 shown in FIG. 1 and pre-processed by the target-tracking system 200 as shown in FIG. 2. Thus, the image frames 402, 404, 406 can be generally aligned with each other. Each aligned image frame 402, 404, 406 includes a collection of pixels.

Figure 5A:
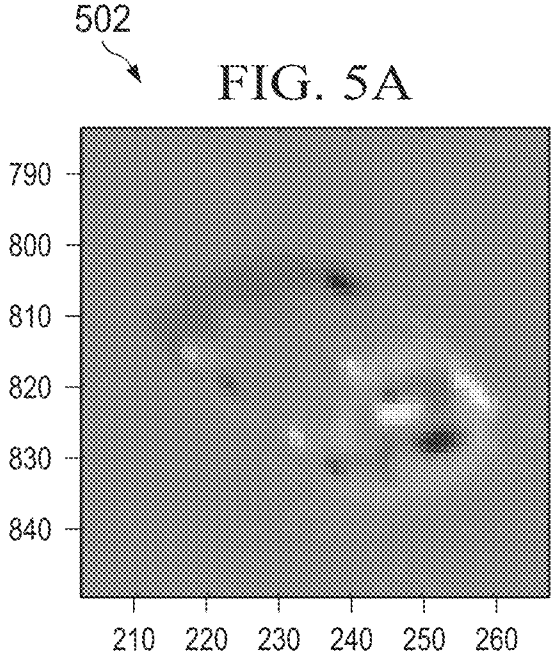
FIGS. 5A through 5C illustrate example difference frames that may be generated by a three-frame difference target-tracking system in accordance with this disclosure.
Figure 5C:
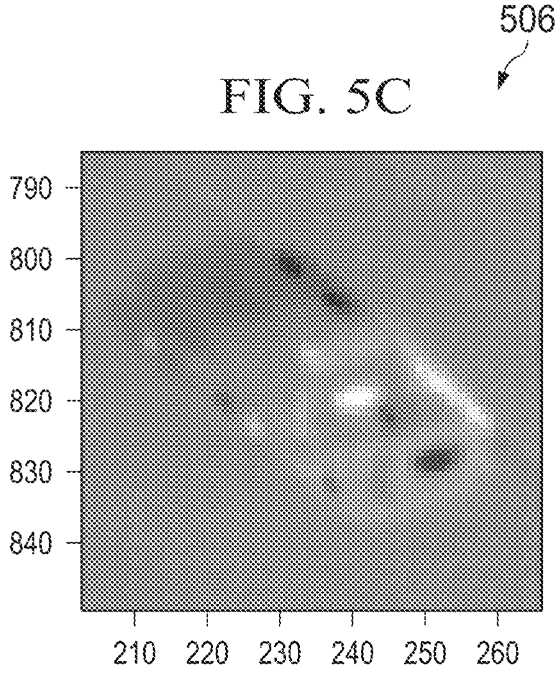
Figure 5B:
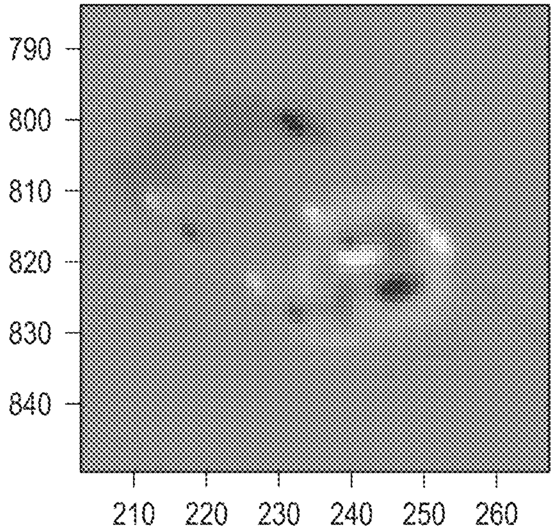

The target-tracking system 200 (such as the three-frame difference calculation element 230) identifies differences between the image frames 402, 404, 406 to generate difference frames. FIGS. 5A through 5C illustrate example difference frames 502, 504, 506 that may be generated by a three-frame difference target-tracking system 200 in accordance with this disclosure. The difference frames 502, 504, 506 here are generated using the image frames 402, 404, 406 that are shown in FIGS. 4A through 4C. For instance, each difference frame 502, 504, 506 can be generated by subtracting the pixel values in one image frame 402, 404, 406 from the pixel values in another image frame 402, 404, 406.

In this example, the difference frame 502 represents pixel-by-pixel differences between the image frames 402, 404, the difference frame 504 represents pixel-by-pixel differences between the image frames 404, 406, and the difference frame 506 represents pixel-by-pixel differences between the image frames 402, 406. In some embodiments, each of the difference frames 502, 504, 506 can be determined using differences between two image frames that have been registered (aligned) to generate a zero-mean image frame. Ideally (assuming perfect warping and alignment), all differences identified in the difference frames 502, 504, 506 are caused by motion of at least one object in a scene. In reality, however, the difference frames 502, 504, 506 can identify differences caused by motion of at least one object and differences caused by clutter or other undesired effects. Once generated, the target-tracking system 200 (such as the three-frame difference calculation element 230) can apply thresholds to the difference frames 502, 504, 506 to label different regions of the difference frames 502, 504, 506.

Figure 6A:
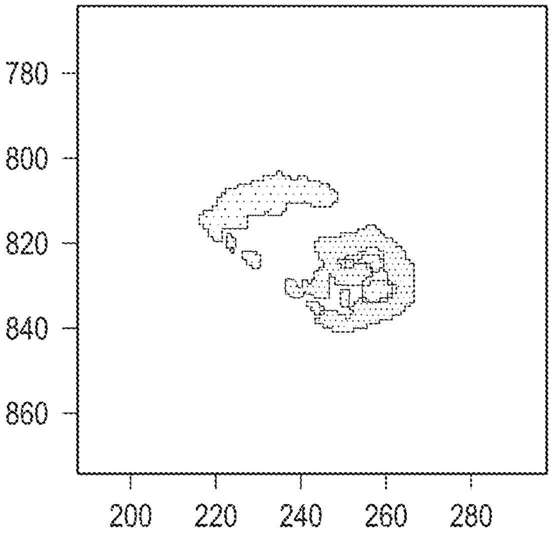
FIGS. 6A through 6C illustrate example thresholded difference frames that may be generated by a three-frame difference target-tracking system in accordance with this disclosure.
Figure 6C:
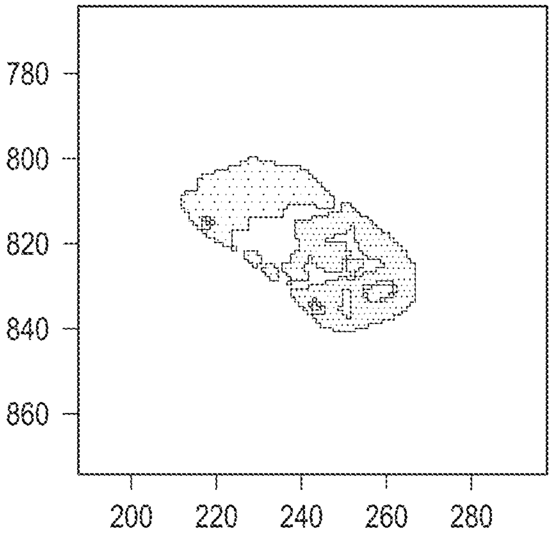
Figure 6B:
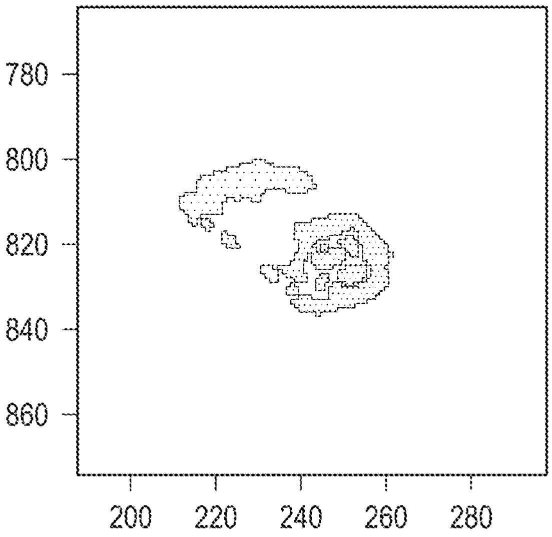

FIGS. 6A through 6C illustrate example thresholded difference frames 602, 604, 606 that may be generated by a three-frame difference target-tracking system 200 in accordance with this disclosure. The thresholded difference frames 602, 604, 606 here are generated by applying two thresholds to the difference frames 502, 504, 506 that are shown in FIGS. 5A through 5C. In particular, the thresholded difference frames 602, 604, 606 can be generated by applying upper and lower thresholds to the pixel values contained in each of the difference frames 502, 504, 506. In some embodiments, the thresholds used for a particular difference frame 502, 504, 506 represent the mean pixel value in that frame plus or minus a value based on the standard deviation of the pixel values in that frame. In particular embodiments, the thresholds used for each difference frame 502, 504, 506 represent the mean pixel value in that frame plus or minus three times the standard deviation of the pixel values in that frame (or other multiple of the standard deviation).

In the example shown in FIGS. 6A through 6C, large portions of the thresholded difference frames 602, 604, 606 have the same general appearance. This is because the image frames 402, 404, 406 are aligned, so the difference frames 502, 504, 506 ideally identify little or no differences between the backgrounds in those image frames 402, 404, 406 (and any identified differences are ideally outside the applied thresholds). Of course, this need not always be the case, and there may be some residual differences between the backgrounds of the image frames 402, 404, 406 that can be filtered out or otherwise processed.

The thresholded difference frames 602, 604, 606 here effectively identify areas of the difference frames 502, 504, 506 in which movement of a target object is likely to have been captured. This is because the thresholded difference frames 602, 604, 606 identify only those areas of the difference frames 502, 504, 506 in which significant amounts of differences were identified between the image frames 402, 404, 406. Other areas of the difference frames 502, 504, 506 may identify little or no differences between the image frames 402, 404, 406. Once the significant differences have been identified, the thresholded difference frames 602, 604, 606 can be processed (such as by the three-frame difference calculation element 230) to identify overlapping regions in the thresholded difference frames.

Figure 7:
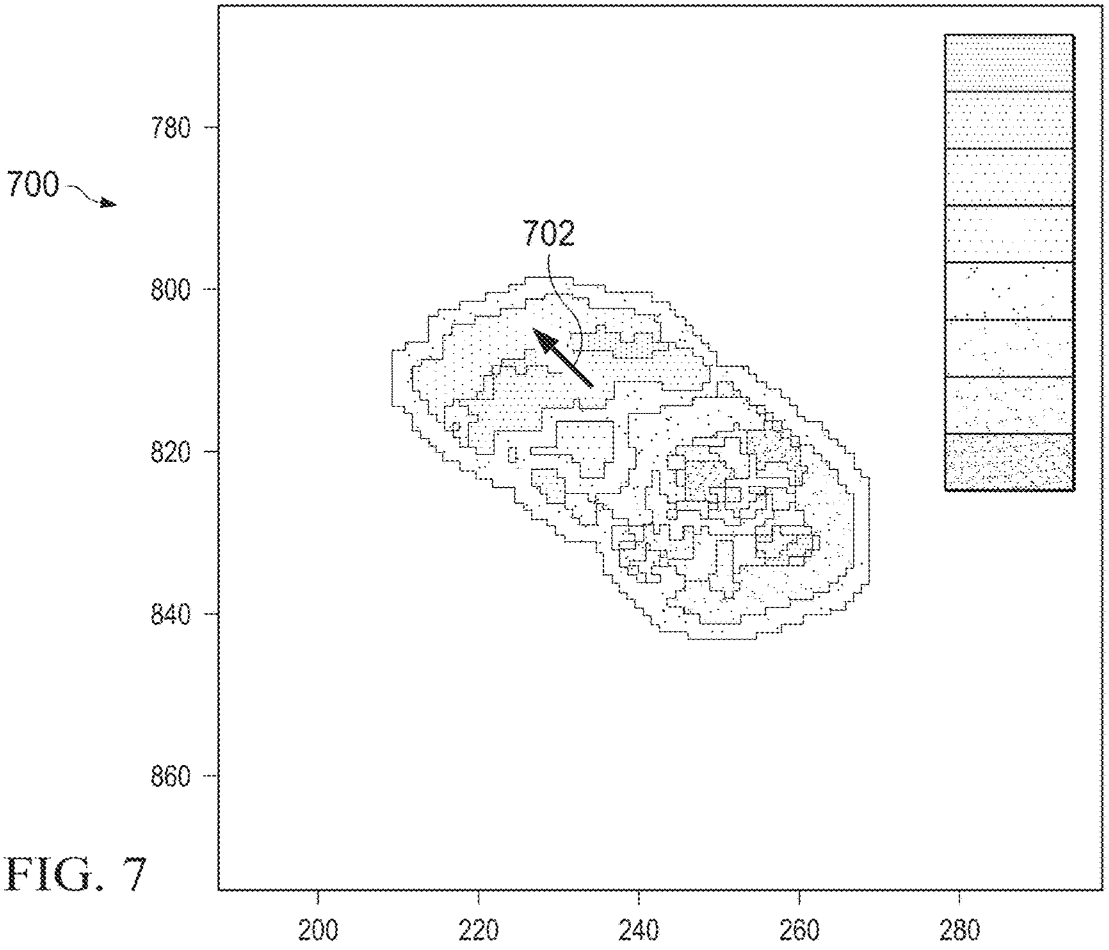
FIG. 7 illustrates an example calculation of thresholded regions from FIG. 6C that overlap with regions from FIGS. 6A and 6B by a three-frame difference target-tracking system in accordance with this disclosure.

FIG. 7 illustrates an example calculation of thresholded regions from FIG. 6C that overlap with regions from FIGS. 6A and 6B by a three-frame difference target-tracking system 200 in accordance with this disclosure. In particular, FIG. 7 illustrates an example segmented frame 700 identifying overlapping regions in the thresholded difference frames 602, 604, 606 that are shown in FIGS. 6A through 6C. The frame 700 can be generated by identifying how the regions in the thresholded difference frames 602, 604 representing significant differences overlap with the regions in the thresholded difference frame 606 representing significant differences. The result is the segmented frame 700 in which different regions are identified based on how those regions overlap in the thresholded difference frames 602, 604, 606.

The generation of the segmented frame 700 can be done on a pixel-by-pixel basis using the thresholded difference frames 602, 604, 606. For example, if corresponding pixels in both thresholded difference frames 602, 604 identify significant differences and overlap with a corresponding pixel in the thresholded difference frame 606 that identifies a significant difference, the segmented frame 700 may have a corresponding pixel value of larger magnitude. If a corresponding pixel in only one of the thresholded difference frames 602, 604 identifies a significant difference and overlaps with a corresponding pixel in the thresholded difference frame 606 that identifies a significant difference, the segmented frame 700 may have a corresponding pixel value of smaller magnitude. The sign (or relative magnitude) of each pixel value in the segmented frame 700 can be based on whether the corresponding pixels in the thresholded difference frames 602, 604, 606 are outside the upper and lower thresholds as discussed above.

Essentially, the regions identified in the thresholded difference frames 602, 604 may represent motion of an object between two image frames captured closer in time. The regions identified in the thresholded difference frame 606 may represent motion of the object between two image frames captured farther apart in time. Thus, the segmented frame 700 can be generated by calculating how the regions identified in the thresholded difference frames 602, 604 are spatially related to (or overlap with) the regions identified in the thresholded difference frame 606. This can help to reduce or eliminate frame difference ambiguities when processing image frames. Colors or other indicators can be used in the segmented frame 700 to identify the extent of this overlap. For example, darker colors (such as darker blues for differences exceeding the upper threshold and darker reds for differences falling below the lower threshold) may be used to identify where regions in both thresholded difference frames 602, 604 overlap with regions in the thresholded difference frame 606. Lighter colors (such as lighter blues for differences exceeding the upper threshold and lighter reds or oranges for differences falling below the lower threshold) may be used to identify where regions in one (but not both) of the thresholded difference frames 602, 604 overlap with regions in the thresholded difference frame 606.

Once the overlapping regions are identified in this manner, at least one motion or velocity vector 702 can be identified (such as by the three-frame difference calculation element 230 or the image-processing element 232). For example, the motion or velocity vector 702 can be determined by identifying the center of mass of the regions from the thresholded difference frame 602 and the center of mass of the regions from the thresholded difference frame 604 that are associated with each other in the thresholded difference frame 606. The vector 702 can then be used to link the centers of mass. The motion or velocity vector 702 here represents the directionality of the movement of the object. Once the motion or velocity vector 702 is identified, the vector 702 can be used (such as by the three-frame difference calculation element 230 or the image-processing element 232) to generate visual vectors superimposed onto an image of the target or for other functions.

Figure 8:
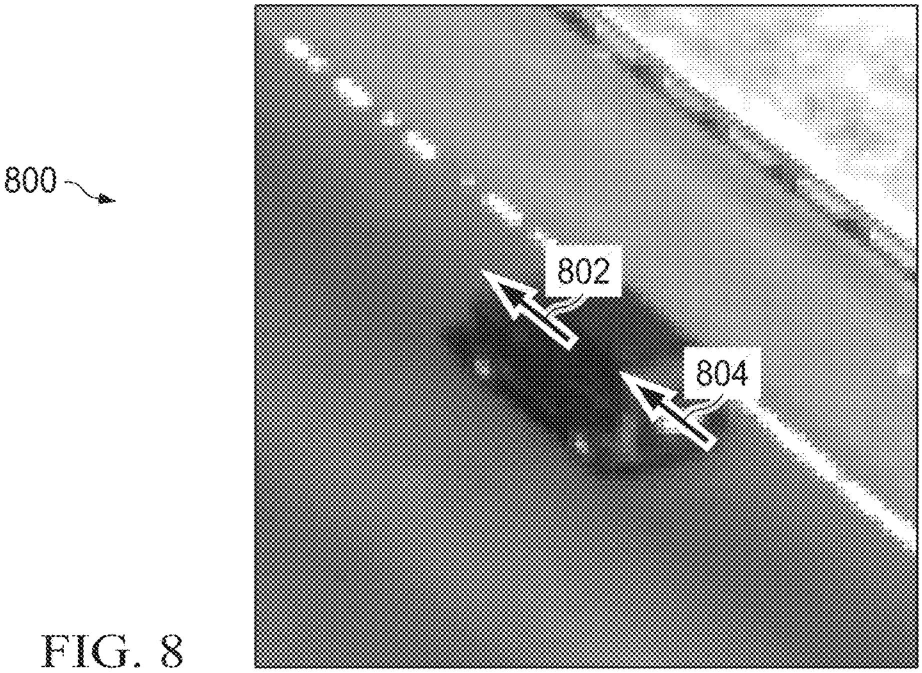
FIG. 8 illustrates an example output image containing motion or velocity vectors for a target that may be generated by a three-frame difference target-tracking system in accordance with this disclosure.

FIG. 8 illustrates an example output image 800 containing motion or velocity vectors 802, 804 for a target that may be generated by a three-frame difference target-tracking system 200 in accordance with this disclosure. As shown in FIG. 8, the output image 800 contains the same target in the same scene as in the image frames 402, 404, 406. The image 800 may be produced in any suitable manner, or the image 800 may simply represent one of the image frames 402, 404, 406.

Overlaid onto the scene are two motion or velocity vectors 802, 804, which represent the identified movement of the target. Each vector 802, 804 may generally be aligned with the vector 702 identified in the segmented frame 700. One vector (vector 802) can be positioned at or near the front or leading edge of the target and be used to identify a direction in which the colors of the segmented frame 700 transition from lighter to darker colors. Another vector (vector 804) can be positioned at or near the back or trailing edge of the target and be used to identify a direction in which the colors of the segmented frame 700 transition from darker to lighter colors. The vectors 802, 804 themselves can further be used to provide an estimate of the extent of the target (as measured from front to back). The vectors 802, 804 are associated with one another here based on the proximity of the vectors 802, 804, the similarity or identicalness of their directions and magnitudes, and the opposite transitions they represent (darker to lighter and lighter to darker). This same process can be used with multiple targets that might be presented in an image, each with their own associated vectors.

Based on the operations described above, the target-tracking system 200 is able to determine a directionality of a target in a scene and possibly an estimated velocity of the target in the scene. There is no requirement here that the target move at least its own length between images of the scene. Moreover, there is no requirement here to identify computationally-complex (and corruptible) background estimates in order to identify the target or its movements.

In some embodiments, the calculation element 230 may generally operate by assuming that there is a fixed interval of time (n) between the image frames 402, 404 and the same fixed interval of time (n) between the image frames 404, 406. If this interval of time is short enough so that acceleration of a target is not a factor, the "signatures" of the target in the thresholded difference frames 602, 604 are due to the target moving for a duration of time n, and the signature of the target in the thresholded difference frame 606 is due to the target moving for a duration of time 2 n. Segmenting the target's signatures using the thresholded difference frames 602, 604, 606 allows for calculation of the association of different regions of the target and an initial estimate of the motion or velocity of the target.

Note that while the vectors 802, 804 here are shown as being overlaid onto the image 800, there is no requirement that one or both vectors 802, 804 actually be displayed to one or more users. In some embodiments, for example, one or both of the vectors 802, 804 may be used to support other functions (such as target tracking), and the vector(s) 802, 804 need not be displayed within the image 800.

Although FIGS. 4A through 8 illustrate example image frames, difference frames, thresholded difference frames, segmented frame, and output image that may be processed or generated by a three-frame difference target-tracking system 200, various changes may be made to FIGS. 4A through 8. For example, the contents of the various images are examples only and are merely meant to illustrate the types of operations that the target-tracking system 200 may perform. Also, as can be seen here, the images 402, 404, and 406 of the target are captured such that the target overlaps with itself in the different images. The use of overlapping target images allows the described approaches here to yield one or more reliably detectable regions in the generated difference images. In addition, as described below, pointwise multiplications can be used in place of thresholds to identify overlapping regions of the difference frames.

Figure 9A:
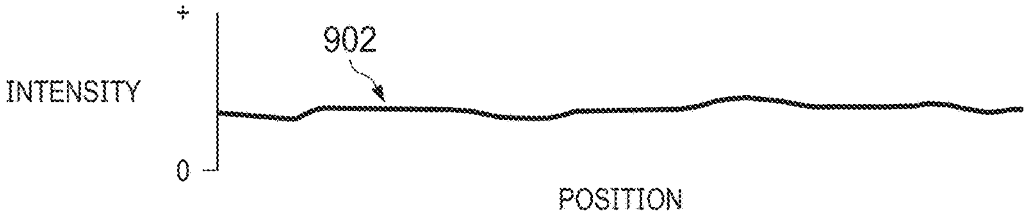
FIGS. 9A through 9O illustrate example processing operations performed by a three-frame difference target-tracking system in accordance with this disclosure.
Figure 9B:
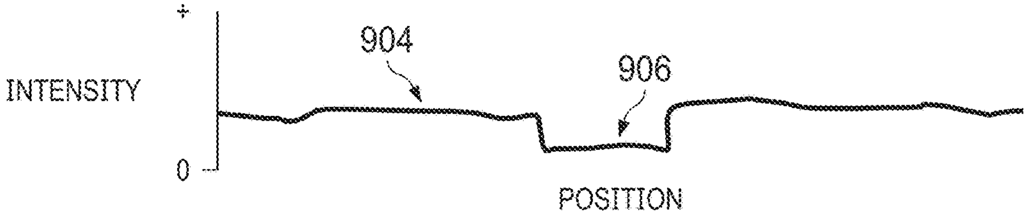
Figure 9C:
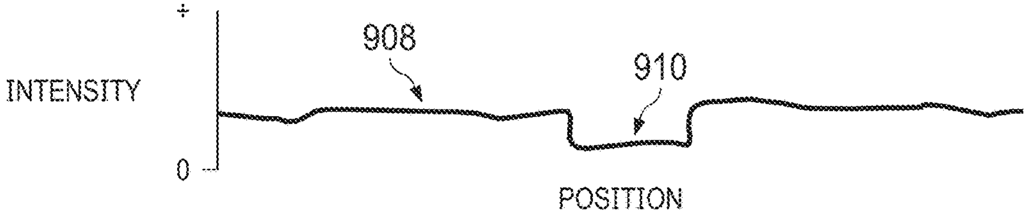
Figure 9D:
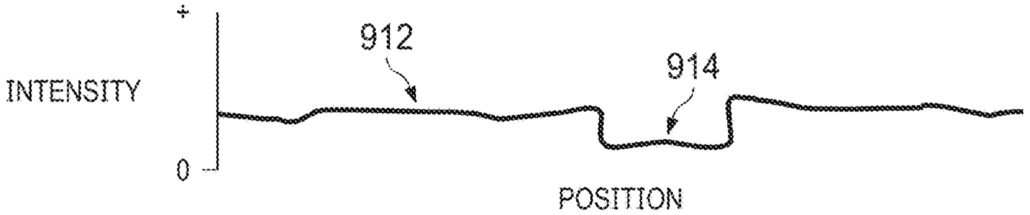
Figure 9E:
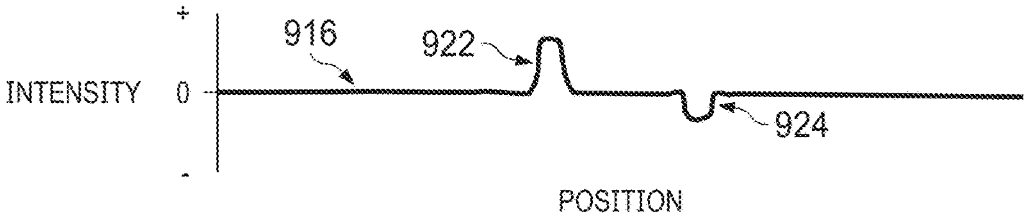
Figure 9F:
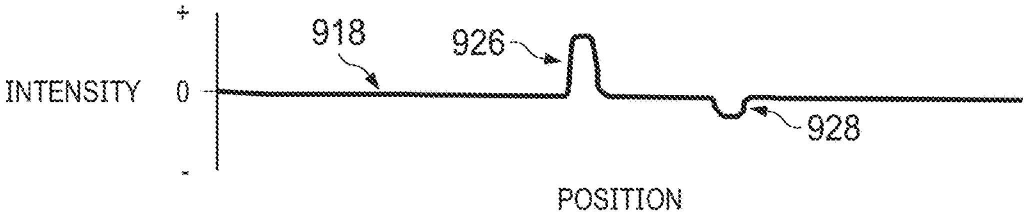
Figure 9G:
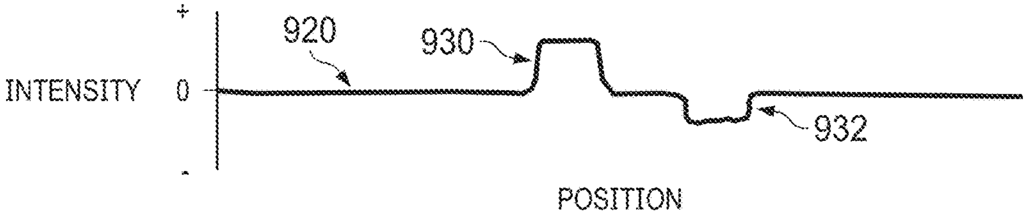
Figure 9H:
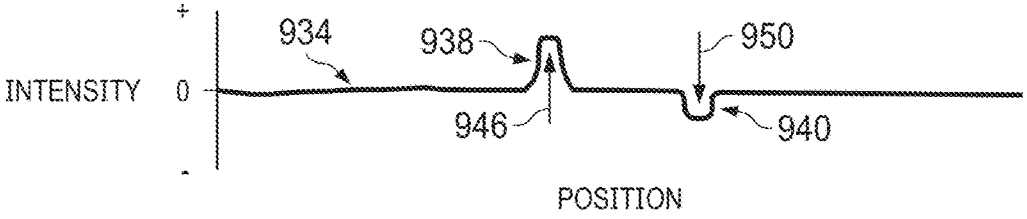
Figure 9I:
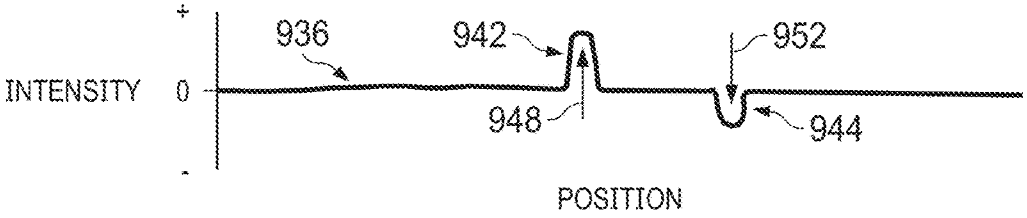
Figure 9J:
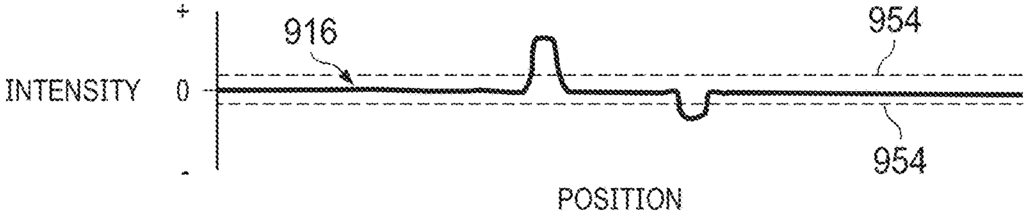
Figure 9K:
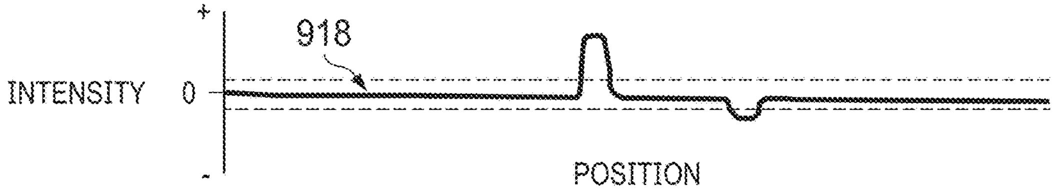
Figure 9L:
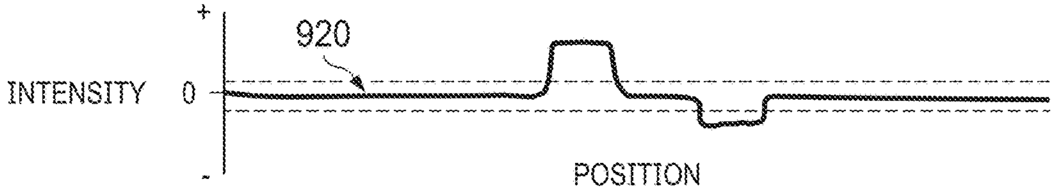
Figure 9M:
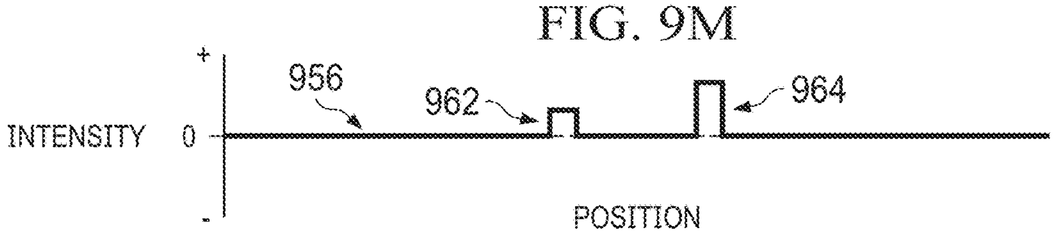
Figure 9N:
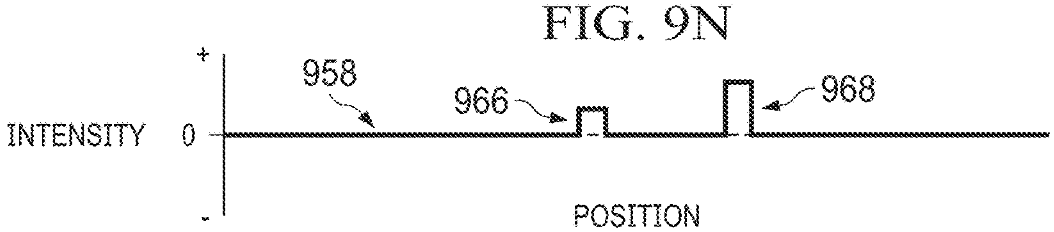
Figure 9O:
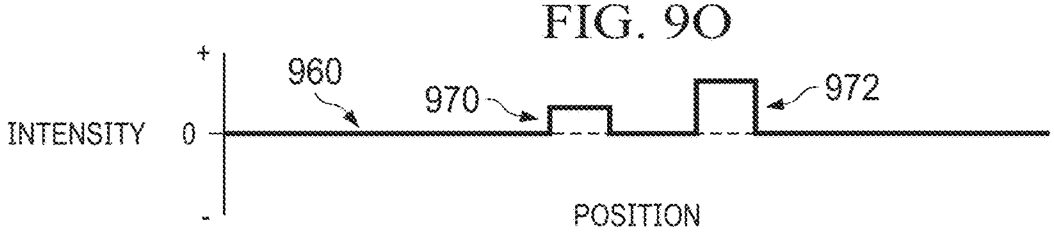

FIGS. 9A through 9O illustrate example processing operations performed by a three-frame difference target-tracking system in accordance with this disclosure. For ease of explanation, the operations shown in FIGS. 9A through 9O are described as being performed using the target-tracking system 200 of FIG. 2, which can be used as the target-tracking system 106 on the platform 102 in the operational environment 100 of FIG. 1. However, the operations shown here may be performed with any suitable system, platform, or environment.

As shown in FIG. 9A, a line 902 plots intensity values along a one-dimensional row of pixels (positions) in an image of a scene. For example, the line 902 may represent pixel values captured of an empty road. Note that the row of pixels here may or may not align with a row of pixels in the imager 104, which may typically include pixels arranged in rows and columns (although other arrangements are also possible).

As shown in FIG. 9B, a line 904 plots intensity values along the same one-dimensional row of pixels, but a group of pixels 906 represents one position of a moving target. These intensity values may be contained within a first image of the scene (such as the image frame 402). As shown in FIG. 9C, a line 908 plots intensity values along the same one-dimensional row of pixels, but a group of pixels 910 represents another position of the moving target. These intensity values may be contained within a second image of the scene (such as the image frame 404). As shown in FIG. 9D, a line 912 plots intensity values along the same one-dimensional row of pixels, but a group of pixels 914 represents yet another position of the moving target. These intensity values may be contained within a third image of the scene (such as the image frame 406). As can be seen here, the groups of pixels 906, 910, 914 overlap, meaning the positions of the target overlap in the three images of the scene.

In FIG. 9E, a line 916 plots intensity difference values along the same one-dimensional row of pixels, where the intensity differences are calculated by subtracting the intensity values in FIG. 9B from the intensity values in FIG. 9C. These intensity difference values may be contained within a first difference frame associated with the scene (such as the difference frame 502). In FIG. 9F, a line 918 plots intensity difference values along the same one-dimensional row of pixels, where the intensity differences are calculated by subtracting the intensity values in FIG. 9C from the intensity values in FIG. 9D. These intensity difference values may be contained within a second difference frame associated with the scene (such as the difference frame 504). In FIG. 9G, a line 920 plots intensity difference values along the same one-dimensional row of pixels, where the intensity differences are calculated by subtracting the intensity values in FIG. 9B from the intensity values in FIG. 9D. These intensity difference values may be contained within a third difference frame associated with the scene (such as the difference frame 506).

A value of zero in FIGS. 9E, 9F, and 9G indicate that there is no difference in intensity values in the two associated image frames. Thus, if a difference frame contains all zero values, the difference frame does not contain a moving target. In FIGS. 9E, 9F, and 9G, there are non-zero intensity values (which can occur at the leading and trailing edges of a target), indicating that the original image frames contain a moving target. In particular, the line 916 includes a positive region 922 and a negative region 924, the line 918 includes a positive region 926 and a negative region 928, and the line 920 includes a positive region 930 and a negative region 932. The regions 930, 932 of the line 920 overlap with the regions 922, 924 of the line 916 and with the regions 926, 928 of the line 918. This allows the regions 922, 924 to be associated with the regions 926, 928.

To identify motion of a target, in some embodiments, a pointwise multiplication of the third difference frame (represented by the line 920 and denoted D3) can be computed with the first difference frame (represented by the line 916 and denoted D1) and with the second difference frame (represented by the line 918 and denoted D2). For example, the following equations may be used:

$$A1=D3\cdot{*}D1\cdot{*}\mathrm{sign}(D3) \quad (1)$$

$$A2=D3\cdot{*}D2\cdot{*}\mathrm{sign}(D3) \quad (2)$$

Here, D1, D2, and D3 represent the difference frames as noted above. Also, A1 represents the pointwise multiplication result based on the difference frames D1 and D3, and A2 represents the pointwise multiplication result based on the difference frames D2 and D3. In addition, the "·*" operation refers to a pointwise multiplication operation. This approach can be used to generate a line 934 as shown in FIG. 9H and a line 936 as shown in FIG. 9I. The line 934 includes regions 938, 940, which represent the overlap of the regions 922, 924 and 930, 932. The line 936 includes regions 942, 944, which represent the overlap of the regions 926, 928 and 930, 932.

Because both regions 922, 926 overlap with the region 930, these regions 922, 926 are associated with one another. Similarly, because both regions 924, 928 overlap with the region 932, these regions 924, 928 are associated with one another. The motion of the target can therefore be determined by identifying motion from the region 922 to the region 926 and motion from the region 924 to the region 928. For example, a direction and magnitude of the target's movement can be calculated using a distance between a center of mass (CoM) 946 of the region 938 and a center of mass 948 of the region 942 and/or a distance between a center of mass 950 of the region 940 and a center of mass 952 of the region 944.

The contrast (positive or negative) of the region at the leading edge of the target is the opposite of the contrast at the trailing edge of the target. Thus, the leading and trailing edges of a target can be associated with one another by searching for regions of opposite contrast with identical velocity (direction and magnitude) within some margin of error to account for things like measurement and calculation errors. This also allows the length of the target to be estimated. Assuming that the leading and trailing edges of a target are closer together than the leading or trailing edges of other targets, proximity can be used to pair closely-spaced regions of opposite contrast to determine the leading and trailing edges of the target. Thus, in this example, the centers of mass 946, 948 can be used to identify the vector 804 at the trailing edge of a target, and the centers of mass 950, 952 can be used to identify the vector 802 at the leading edge of the target.

A more robust approach to identifying moving targets may involve working with connected and labeled groups of pixels. This may be necessary or desirable, for example, when a scene includes a number of moving targets or a lot of clutter. As shown in FIGS. 9J, 9K, and 9L, two thresholds 954 can be applied to the intensity difference values represented by the lines 916, 918, 920. This leads to the generation of lines 956, 958, 960 representing thresholded intensity difference values as shown in FIGS. 9M, 9N, and 9O. The difference images are thresholded to obtain connected regions of both positive and negative contrast. The regions in each image can then be given a unique label to identify those regions. The line 956 includes regions 962, 964 where the line 916 violated at least one of the thresholds 954, the line 958 includes regions 966, 968 where the line 9168 violated at least one of the thresholds 954, and the line 960 includes regions 970, 972 where the line 920 violated at least one of the thresholds 954.

Through a pixel-wise comparison of the resulting frames, it can be determined that the region 970 overlaps with the regions 962, 966, so the regions 962, 966 are associated with each other. Similarly, through a pixel-wise comparison of the resulting image frames, it can be determined that the region 972 overlaps with the regions 964, 968, so the regions 964, 968 are associated with each other. Vectors connecting the associated regions 962, 966 and 964, 968 can then be generated as described above. In addition, the contrasts of the regions 962-972 can be determined to enable the leading and trailing edges of the target to be determined as described above.

Although FIGS. 9A through 9O illustrate examples of processing operations performed by a three-frame difference target-tracking system, various changes may be made to FIGS. 9A through 9O. For example, the actual values shown in FIGS. 9A through 9O are for illustration only and are merely meant to illustrate the types of operations that can be performed by a three-frame difference target-tracking system.

Figure 10:
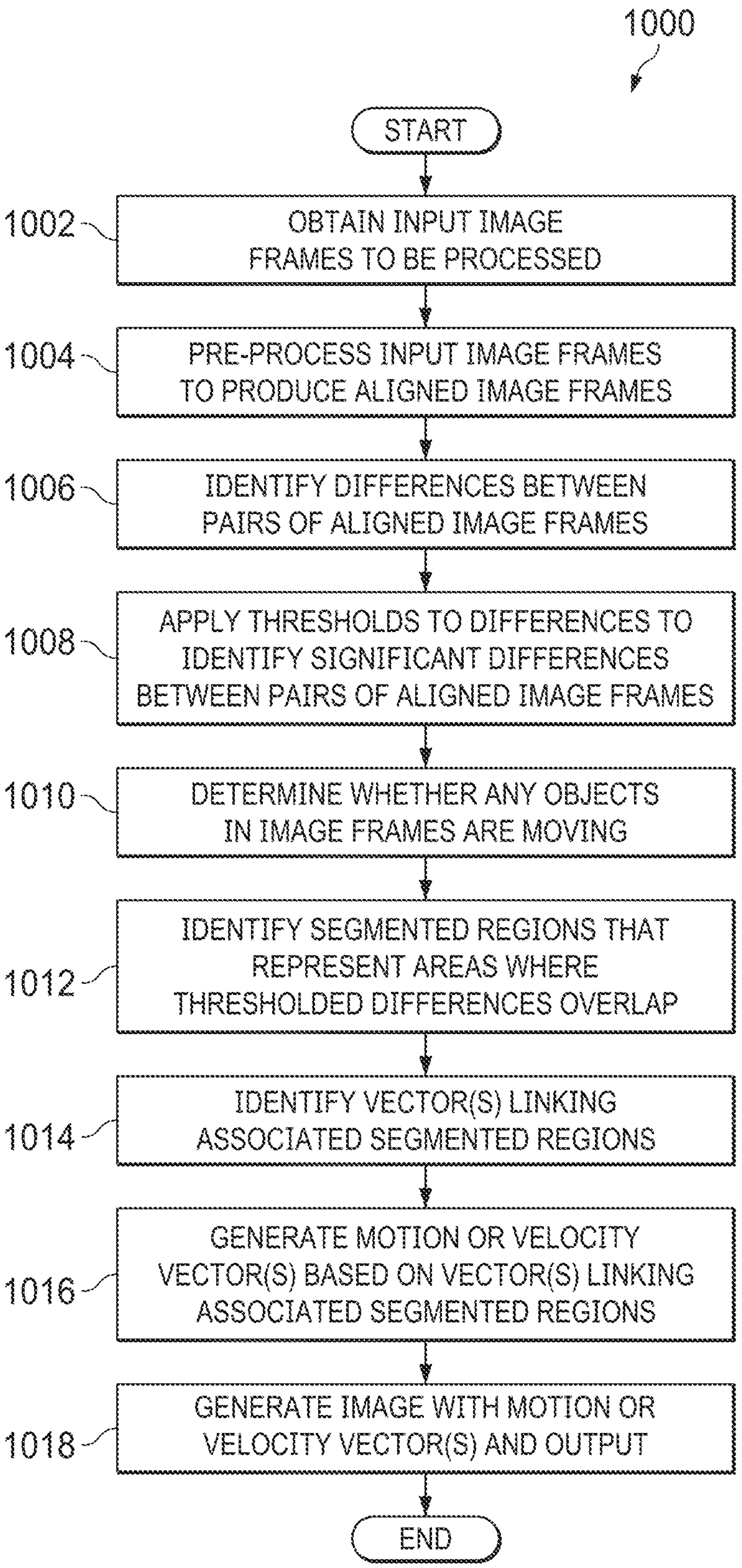
FIG. 10 illustrates an example method for three-frame difference target acquisition using overlapping target images in accordance with this disclosure.

FIG. 10 illustrates an example method 1000 for three-frame difference target acquisition using overlapping target images in accordance with this disclosure. For ease of explanation, the method 1000 of FIG. 10 is described as involving the use of the target-tracking system 200 of FIG. 2 with the platform 102 in the operational environment 100 of FIG. 1. However, the method 1000 of FIG. 10 may be used with any suitable target-tracking system and any suitable platform in any suitable operational environment.

As shown in FIG. 10, input image frames to be processed are obtained at step 1002 and pre-processed to produce aligned image frames at step 1004. This can include, for example, the target-tracking system 200 receiving input image frames 201 from any suitable source(s), such as the imager 104. This can also include the target-tracking system 200 performing conditioning, delaying, warping, transformation, registering, and offset operations described above. The result of the pre-processing may represent a set of aligned image frames 402, 404, 406. The image frames can include a reference image frame 207 and two offset image frames 227, 229 that are generally aligned with one another.

Differences between pairs of aligned image frames are identified at step 1006. This can include, for example, the target-tracking system 200 identifying differences between pixel values in the image frames 402, 404 to generate a difference frame 502, identifying differences between pixel values in the image frames 404, 406 to generate a difference frame 504, and identifying differences between pixel values in the image frames 402, 406 to generate a difference frame 506. Thresholds may be applied to the differences to identify significant differences between the pairs of aligned image frames at step 1008. This can include, for example, the target-tracking system 200 identifying upper and lower thresholds for each difference frame 502, 504, 506. In some embodiments, the thresholds for each difference frame 502, 504, 506 can represent the mean pixel value in that frame plus or minus an integer or non-integer multiple of the standard deviation of the pixel values in that frame (such as three times the standard deviation). This can also include the target-tracking system 200 identifying the pixel values in each difference frame 502, 504, 506 that exceed the upper threshold or fall below the lower threshold to generate thresholded difference frames 602, 604, 606.

A determination is made whether any moving objects in the image frames are detected at step 1010. This can include, for example, the target-tracking system 200 determining whether the identified regions in the thresholded difference frames 602, 604, 606 (which are above or below the applied thresholds) are larger than a specified minimum size. As a particular example, this can include the target-tracking system 200 determining whether the identified regions in the thresholded difference frames 602, 604, 606 include at least a specified minimum number of pixels. The specified minimum number of pixels can be defined in any suitable manner, such as based on the amount of ground that each pixel of the image frames represents.

Assuming at least one moving object is detected, segmented regions that represent areas where the thresholded differences overlap can be identified at step 1012. This can include, for example, the target-tracking system 200 identifying regions in one or more of the thresholded difference frames 602, 604 that overlap with regions in the thresholded difference frame 606 to generate a segmented frame 700. Note, however, that the use of thresholds and thresholded differences is not required. In other embodiments, for instance, pointwise multiplications between difference frames can be used to identify the segmented regions.

One or more vectors linking segmented regions that are associated with one another are identified at step 1014. This can include, for example, the target-tracking system 200 identifying at least one vector 702 that links regions in the thresholded difference frames 602, 604 associated with one another by the thresholded difference frame 606. The results of pointwise multiplications can alternatively be used to identify associated segmented regions. One or more motion or velocity vectors are generated based on the vector(s) linking the associated segmented regions at step 1016. This can include, for example, the target-tracking system 200 generating a motion or velocity vector 802 at the front of a target and a motion or velocity vector 804 at the back of the target.

The motion or velocity vector(s) can then be used in some manner. For example, an image containing the motion or velocity vector(s) may be generated and output at step 1018. This can include, for example, the target-tracking system 200 generating an output image 800 containing motion or velocity vectors 802, 804 for each target in the image 800. Note, however, that the motion or velocity vector(s) can be used in any other suitable manner.

Although FIG. 10 illustrates one example of a method 1000 for three-frame difference target acquisition using overlapping target images, various changes may be made to FIG. 10. For example, while shown as a series of steps, various steps in FIG. 10 may overlap, occur in parallel, occur in a different order, or occur any number of times. As a particular example, the target-tracking system 200 may use a sliding window to process different overlapping sets of input images in order to identify and update the motion or velocity vector(s) for one or more targets in a scene.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A three-frame difference target-tracking system comprising:
- at least one processor configured to:
  - obtain multiple aligned image frames of a scene, the aligned image frames including first, second, and third image frames;
  - identify differences between the first image frame and the second image frame, between the second image frame and the third image frame, and between the first image frame and the third image frame;
  - apply upper and lower thresholds to the identified differences; and
  - identify a direction of movement of a target in the scene based on the identified differences that are outside the upper and lower thresholds.

2. The system of claim 1, wherein:
- the at least one processor is further configured to:
  - generate difference frames identifying the differences between the first and second image frames, the second and third image frames, and the first and third image frames;
  - for each of the difference frames, generate a thresholded difference frame identifying the differences in the difference frame that are outside the upper and lower thresholds for the difference frame;
  - determine that regions in the thresholded difference frames are indicative of movement of the target; and
  - identify segmented regions of the thresholded difference frames that overlap; and
- the at least one processor is configured to identify the direction of movement of the target in the scene based on the segmented regions of the thresholded difference frames.

3. The system of claim 2, wherein the at least one processor is further configured to:
- identify at least one vector between segmented regions from two of the thresholded difference frames that are associated with one another based on a third of the thresholded difference frames; and identify at least one motion or velocity vector based on the at least one vector.

4. The system of claim 1, wherein the at least one processor is further configured to:

receive first, second, and third input image frames; and pre-process the first, second, and third input image frames to generate the aligned image frames.

5. A three-frame difference target-tracking system comprising:

at least one processor configured to:

obtain multiple aligned image frames of a scene, the aligned image frames including first, second, and third image frames;

identify differences between the first image frame and the second image frame, between the second image frame and the third image frame, and between the first image frame and the third image frame; and identify a direction of movement of a target in the scene based on the identified differences;

wherein, to identify the direction of movement of the target in the scene, the at least one processor is configured to:

apply a first pointwise multiplication using (i) the differences between the first image frame and the third image frame and (ii) the differences between the first image frame and the second image frame;

apply a second pointwise multiplication using (i) the differences between the first image frame and the third image frame and (ii) the differences between the second image frame and the third image frame;

identify centers of mass of multiple regions in results of the first and second pointwise multiplications; and identify the direction of movement based on the centers of mass for associated regions.

6. The system of claim 5, wherein:

the at least one processor is further configured to apply upper and lower thresholds to the identified differences; and the at least one processor is configured to identify the direction of movement of the target in the scene based on the identified differences that are outside the upper and lower thresholds.

7. A three-frame difference target-tracking system comprising:

at least one processor configured to:

obtain first, second, and third input image frames;

pre-process the first, second, and third input image frames to generate multiple aligned image frames, the aligned image frames including first, second, and third image frames;

identify differences between the first image frame and the second image frame, between the second image frame and the third image frame, and between the first image frame and the third image frame; and identify a direction of movement of a target in the scene based on the identified differences;

wherein, to pre-process the first, second, and third input image frames, the at least one processor is configured to:

generate first and second warped image frames based on the first and third input image frames;

generate a reference image frame based on the second input image frame;

perform a transform of the first warped image frame to generate first image information, a transform of the reference image frame to generate second image information, and a transform of the second warped image frame to generate third image information;

perform a first registration to align the first and second image information and a second registration to align the second and third image information; and offset pixels of the first warped image frame based on an output of the first registration and offset pixels of the second warped image frame based on an output of the second registration to generate the first and third image frames, the second image frame comprising the reference image frame.

8. A three-frame difference target-tracking method comprising:

obtaining multiple aligned image frames of a scene, the aligned image frames including first, second, and third image frames;

identifying differences between the first image frame and the second image frame, between the second image frame and the third image frame, and between the first image frame and the third image frame;

applying upper and lower thresholds to the identified differences; and identifying a direction of movement of a target in the scene based on the identified differences that are outside the upper and lower thresholds.

9. The method of claim 8, further comprising:

generating difference frames identifying the differences between the first and second image frames, the second and third image frames, and the first and third image frames;

for each of the difference frames, generating a thresholded difference frame identifying the differences in the difference frame that are outside the upper and lower thresholds for the difference frame;

determining that regions in the thresholded difference frames are indicative of movement of the target; and identifying segmented regions of the thresholded difference frames that overlap;

wherein the direction of movement of the target in the scene is based on the segmented regions of the thresholded difference frames.

10. The method of claim 9, further comprising:

identifying at least one vector between segmented regions from two of the thresholded difference frames that are associated with one another based on a third of the thresholded difference frames; and identifying at least one motion or velocity vector based on the at least one vector.

11. The method of claim 8, further comprising:

receiving first, second, and third input image frames; and pre-processing the first, second, and third input image frames to generate the aligned image frames.

12. A three-frame difference target-tracking method comprising:

obtaining multiple aligned image frames of a scene, the aligned image frames including first, second, and third image frames;

identifying differences between the first image frame and the second image frame, between the second image frame and the third image frame, and between the first image frame and the third image frame; and identifying a direction of movement of a target in the scene based on the identified differences;

wherein identifying the direction of movement of the target in the scene comprises:

applying a first pointwise multiplication using (i) the differences between the first image frame and the third image frame and (ii) the differences between the first image frame and the second image frame;

applying a second pointwise multiplication using (i) the differences between the first image frame and the third image frame and (ii) the differences between the second image frame and the third image frame;

identifying centers of mass of multiple regions in results of the first and second pointwise multiplications; and identifying the direction of movement based on the centers of mass for associated regions.

13. A three-frame difference target-tracking method comprising:

obtaining first, second, and third input image frames;

pre-processing the first, second, and third input image frames to generate multiple aligned image frames, the aligned image frames including first, second, and third image frames;

identifying differences between the first image frame and the second image frame, between the second image frame and the third image frame, and between the first image frame and the third image frame; and identifying a direction of movement of a target in the scene based on the identified differences;

wherein pre-processing the first, second, and third input image frames comprises:

generating first and second warped image frames based on the first and third input image frames;

generating a reference image frame based on the second input image frame;

performing a transform of the first warped image frame to generate first image information, a transform of the reference image frame to generate second image information, and a transform of the second warped image frame to generate third image information;

performing a first registration to align the first and second image information and a second registration to align the second and third image information; and offsetting pixels of the first warped image frame based on an output of the first registration and offsetting pixels of the second warped image frame based on an output of the second registration to generate the first and third image frames, the second image frame comprising the reference image frame.

14. The method of claim 13, further comprising:

applying upper and lower thresholds to the identified differences;

wherein the direction of movement of the target in the scene is based on the identified differences that are outside the upper and lower thresholds.

15. A non-transitory computer readable medium containing instructions that when executed cause a three-frame difference target-tracking system to:

obtain multiple aligned image frames of a scene, the aligned image frames including first, second, and third image frames;

identify differences between the first image frame and the second image frame, between the second image frame and the third image frame, and between the first image frame and the third image frame;

apply upper and lower thresholds to the identified differences; and identify a direction of movement of a target in the scene based on the identified differences that are outside the upper and lower thresholds.

16. The non-transitory computer readable medium of claim 15, wherein:

the medium further contains instructions that when executed cause the three-frame difference target-tracking system to:

generate difference frames identifying the differences between the first and second image frames, the second and third image frames, and the first and third image frames;

for each of the difference frames, generate a thresholded difference frame identifying the differences in the difference frame that are outside the upper and lower thresholds for the difference frame;

determine that regions in the thresholded difference frames are indicative of movement of the target; and identify segmented regions of the thresholded difference frames that overlap; and the direction of movement of the target in the scene is based on the segmented regions of the thresholded difference frames.

17. The non-transitory computer readable medium of claim 16, wherein the medium further contains instructions that when executed cause the three-frame difference target-tracking system to:

identify at least one vector between segmented regions from two of the thresholded difference frames that are associated with one another based on a third of the thresholded difference frames; and identify at least one motion or velocity vector based on the at least one vector.

18. The non-transitory computer readable medium of claim 15, wherein the medium further contains instructions that when executed cause the three-frame difference target-tracking system to:

receive first, second, and third input image frames; and pre-process the first, second, and third input image frames to generate the aligned image frames.

19. A non-transitory computer readable medium containing instructions that when executed cause a three-frame difference target-tracking system to:

obtain multiple aligned image frames of a scene, the aligned image frames including first, second, and third image frames;

identify differences between the first image frame and the second image frame, between the second image frame and the third image frame, and between the first image frame and the third image frame; and identify a direction of movement of a target in the scene based on the identified differences;

wherein the instructions that when executed cause the three-frame difference target-tracking system to identify the direction of movement of the target in the scene comprise instructions that when executed cause the three-frame difference target-tracking system to:

apply a first pointwise multiplication using (i) the differences between the first image frame and the third image frame and (ii) the differences between the first image frame and the second image frame;

apply a second pointwise multiplication using (i) the differences between the first image frame and the third image frame and (ii) the differences between the second image frame and the third image frame;

identify centers of mass of multiple regions in results of the first and second pointwise multiplications; and identify the direction of movement based on the centers of mass for associated regions.

20. The non-transitory computer readable medium of claim 19, wherein:

the medium further contains instructions that when executed cause the three-frame difference target-tracking system to apply upper and lower thresholds to the identified differences; and the direction of movement of the target in the scene is based on the identified differences that are outside the upper and lower thresholds.

21. A non-transitory computer readable medium containing instructions that when executed cause a three-frame difference target-tracking system to:

obtain first, second, and third input image frames;

pre-process the first, second, and third input image frames to generate multiple aligned image frames, the aligned image frames including first, second, and third image frames;

identify differences between the first image frame and the second image frame, between the second image frame and the third image frame, and between the first image frame and the third image frame; and identify a direction of movement of a target in the scene based on the identified differences;

wherein the instructions that when executed cause the three-frame difference target-tracking system to pre-process the first, second, and third input image frames comprise instructions that when executed cause the three-frame difference target-tracking system to:

generate first and second warped image frames based on the first and third input image frames;

generate a reference image frame based on the second input image frame;

perform a transform of the first warped image frame to generate first image information, a transform of the reference image frame to generate second image information, and a transform of the second warped image frame to generate third image information;

perform a first registration to align the first and second image information and a second registration to align the second and third image information; and offset pixels of the first warped image frame based on an output of the first registration and offset pixels of the second warped image frame based on an output of the second registration to generate the first and third image frames, the second image frame comprising the reference image frame.

* * * * *